April 24, 1934.  O. SCHWIMMER  1,956,082
CREAM PREPARER
Filed Aug. 26, 1931   3 Sheets-Sheet 2
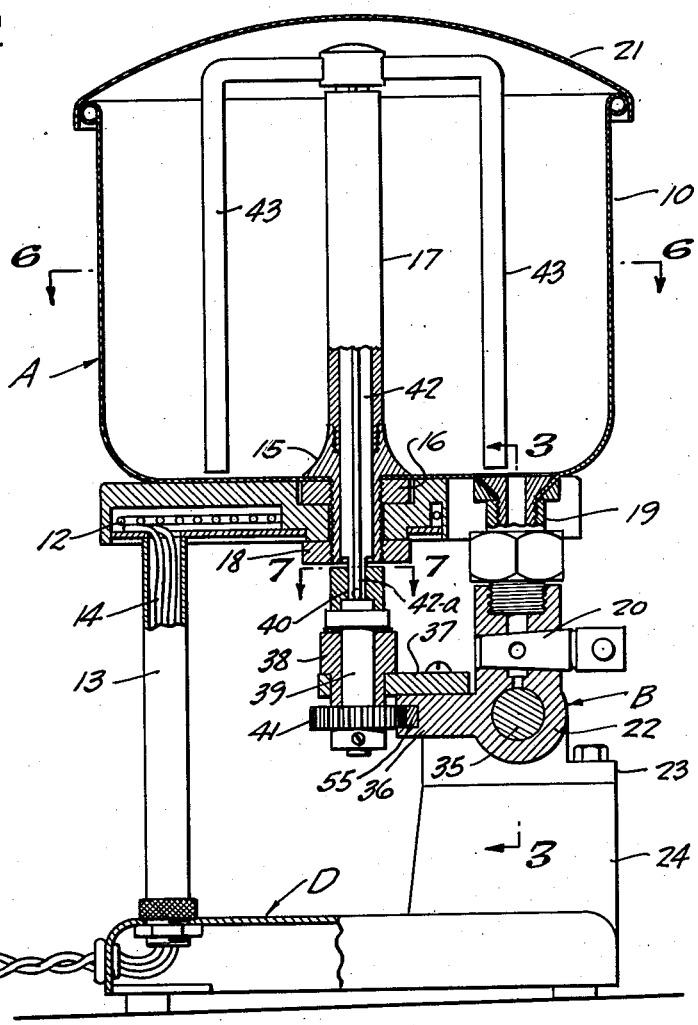
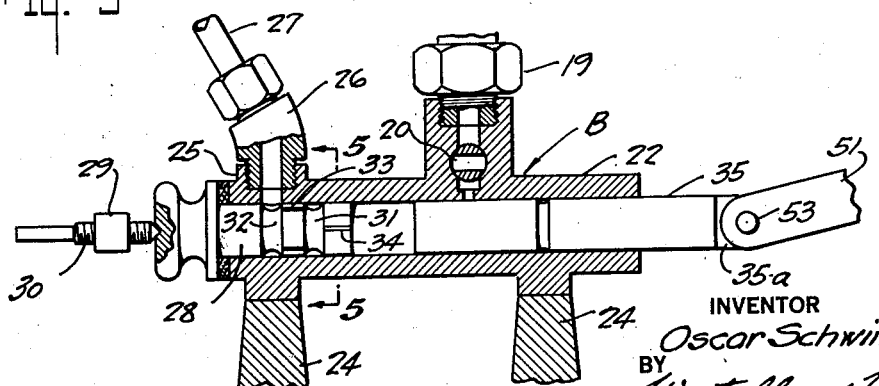
INVENTOR
Oscar Schwimmer
BY Westall and Wallace
ATTORNEYS April 24, 1934. O. SCHWIMMER 1,956,082
CREAM PREPARER
Filed Aug. 26, 1931 3 Sheets-Sheet 3
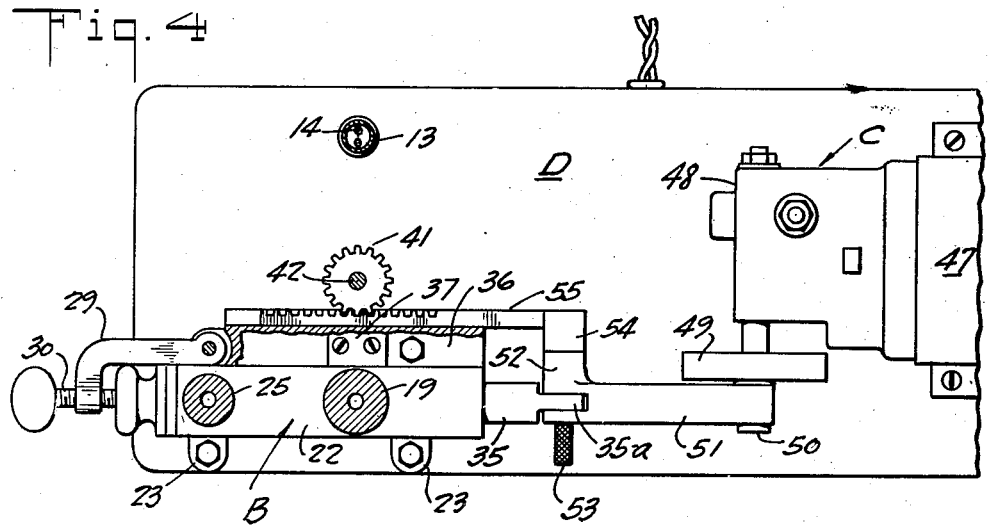
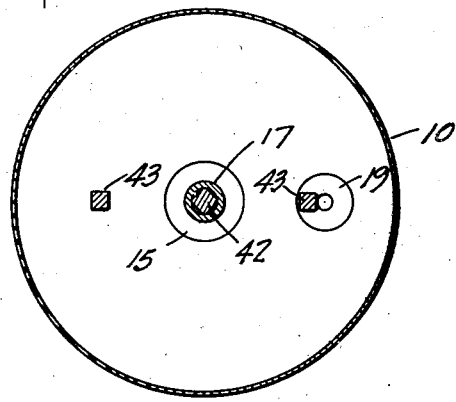
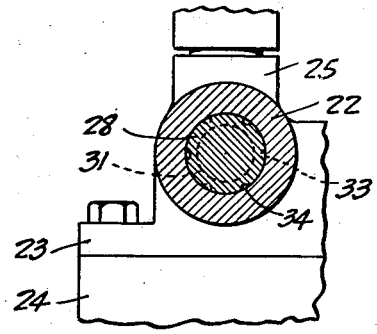
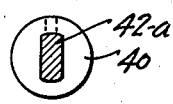
INVENTOR
Oscar Schwimmer
BY
Westall and Wallace
ATTORNEYS Patented Apr. 24, 1934

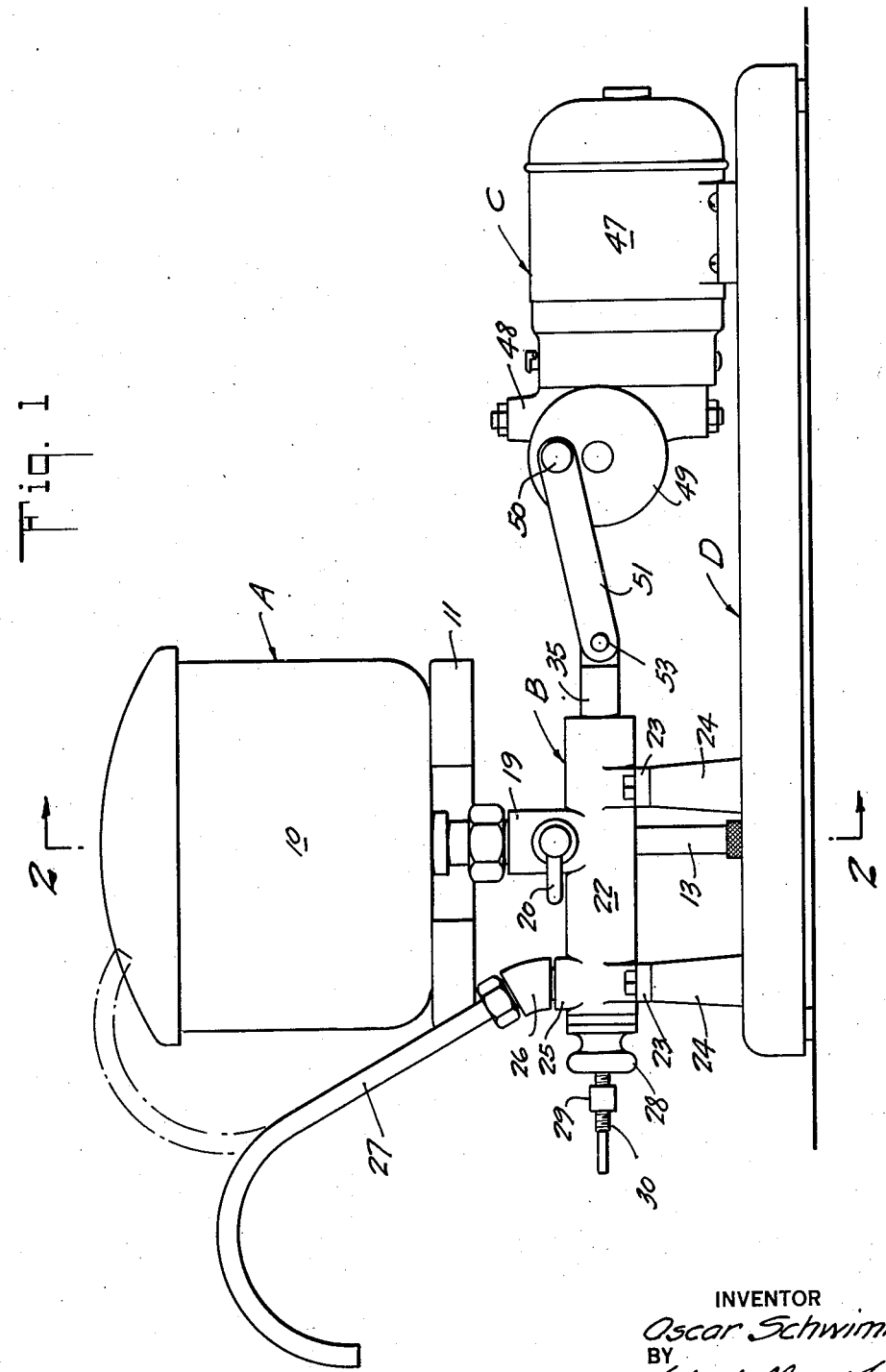

1,956,082

UNITED STATES PATENT OFFICE 1,956,082

CREAM PREPARER

Oscar Schwimmer, Los Angeles, Calif., assignor to Flora Arnold, Los Angeles, Calif.

Application August 26, 1931, Serial No. 559,479

7 Claims. (Cl. 99—2)

This invention relates to a machine for producing an emulsion of fat and a liquid such as butter and milk. Referring specifically to a butter and milk emulsion, cream is commonly graded according to its butter fat content and the greater the butter fat content, the richer is the cream. However, commercially only a limited amount of rich cream is available and the demand for such cream is not great. The present machine has for its primary object the provision of a machine for incorporating butter fat in milk to produce an emulsion which corresponds to cream of any degree of richness desired. To this end, sweet butter is mixed with milk and thoroughly diffused therethrough to produce a uniform cream emulsion.

The present machine contemplates an agitating device with means to heat and increase the fluidity of the butter, and a pump to make uniform the fat globules and produce a homogeneous emulsification.

It is the primary object of this invention to provide a simple machine so constructed to permit easy cleaning, having few parts and capable of sterilization with a minimum of labor whereby a sanitary efficient emulsifying device is obtained.

Another object of this invention is to provide an emulsifying pump whereby a butter and milk mixture is forced through restricted passages to produce emulsification.

A further object of this invention is to provide an emulsifying pump of the character described having no valves and capable of expeditious disassembly for cleaning and sterilization.

These objects together with other objects and corresponding accomplishments are obtained by means of the embodiment of the invention illustrated in the accompanying drawings, in which:

Fig. 1 is an elevation of the complete machine; Fig. 2 is a section as seen on the plane designated 2—2 in Fig. 1; Fig. 3 is a fragmentary section as seen on the plane designated 3—3 in Fig. 2; Fig. 4 is a horizontal section through the machine; Fig. 5 is a section as seen on the plane designated 5—5 in Fig. 3; and Figs. 6 and 7 are sections as seen on the planes correspondingly designated in Fig. 2.

Referring more particularly to the drawings, a mixer is indicated by A. Below the mixer is an emulsifier B. The motor mechanism for operating the mixer and emulsifier is marked C. The structure is mounted upon a convenient base D.

The mixer comprises a bowl 10 supported upon a plate 11. In the plate are electrical heating elements 12 for supplying heat to the contents of the bowl. A tubular standard 13 serves as a conduit for electrical leads 14 for supplying energy to the heating elements. The plate is bored to receive a bushing 15. The bushing is held in leak-tight position against the bottom of the bowl by a nut 16 which fits into a recess in plate 11. The bushing is counterbored at the top to receive a sleeve 17 for housing the shaft of a stirrer. A nut 18 holds the bushing 15 in position upon plate 11. A transfer conduit 19 is secured to the bottom of the bowl and serves for discharging the contents to the emulsifying pump. This transfer conduit consists of a number of fittings, one of which comprises a casing for a rotary valve plug 20. A slip-on cover 21 is provided for bowl 10.

The pump is formed by a barrel 22 having lugs 23 for reception of bolts to fasten the barrel to standard 24 upstanding from the base D. The transfer conduit 19 opens through a port into one end of barrel 22. At the one end of the barrel is a discharge port formed in a boss 25 to which an angular coupling 26 is secured. A goose-neck discharge pipe 27 is secured to coupling 26 and is so arranged that the discharge pipe may be turned so as to direct liquid back into the bowl 10 when in the position shown in dot and dash lines in Fig. 1. The ends of barrel 22 are open and inserted in the far end of the barrel is an emulsifying plug 28. This plug has a head and a shoulder to abut the end of the barrel and may be held in position by a clamp consisting of a pivoted arm 29 with a laterally turned end. The end is provided with a threaded bore to receive a clamping screw 30 which may abut the head. In the shank of the plug are annular grooves 31 and 32. Groove 32 registers with the discharge port and is connected to groove 31 by restricted ducts 33. Groove 31 is connected to the chamber of the barrel by restricted ducts 34. Reciprocatingly mounted in the barrel is a plunger 35. This plunger is reduced and flattened at one end as indicated by 35a. Extending from one side of the barrel 22 is a rib 36 having a groove forming a slideway for a rack. Secured on the upper side of rib 36 is a plate 37 having a bore for receiving a bearing bushing 38. Mounted in the bearing is a shaft section 39 having a socket 40 at its upper end. The shaft 39 is provided with a head at its upper end to take downward thrust. Secured to the lower end of shaft 39 is a pinion 41 for meshing with the rack in slideway 36. An agitator shaft 42 has a flattened end 42a to slip into the socket 40. This agitator shaft may be inserted from the top of sleeve 17 and is removable by lifting it from the sleeve. Secured to the shaft 42 are agitator or stirrer arms 43 which hang downwardly and clear the bottom of the bowl.

The motor mechanism comprises an electric motor 47 with suitable reduction gearing disposed in a housing 48. A crank disk 49 is connected to the reduction gearing and is provided with a crank pin 50. The crank pin carries a connecting rod 51 having a slot at one end to receive the flattened end 35a of the plunger. A hub 52 extends laterally from the connecting rod, and the plunger and rod are pivotally secured by a pin 53. The pin 53 extends to a boss 54 formed on one end of a rack 55 mounted in slideway 36. The rack meshes with the pinion 41. By rotation of the crank disk, the plunger and rack are reciprocated. Reciprocation of the rack causes oscillation of the pinion and through the intermediate connections oscillation of the stirrer. The leads for supplying current to the motor may be connected in circuit with the leads for the heater coils 12 so that when the motor is operating the bowl is heated.

In the preparation of cream, the valve 20 is disposed in closed position and milk is placed in the bowl 10. An amount of butter which is in suitable proportion to the quality of the cream desired is also placed in a bowl. The motor C is started in operation. This causes the stirrer to oscillate. The heat makes the butter more liquid and also places the milk in better condition for mixing with the butter. The stirrer effects a mixture. However, the globules of butter fat do not affect perfect emulsion. After mixing has been thoroughly performed in the bowl 10, the valve 20 is opened. The mixed milk and butter is transferred to the pump barrel. At each stroke of the plunger 35 the inlet port is overrun and the mixture trapped between the emulsifier plug and the plunger. Pressure is exerted upon this trapped mixture and it is forced through restricted ducts 34 into the groove 31. In the passage through the restricted openings emulsification is attained. Further movement of the plunger causes the emulsified liquid to pass through the restricted ducts 33 into the groove 32 and thence to delivery tube 27. On the return stroke, the emulsified liquid only enters the barrel 22 in a small amount due to the restricted ducts. There is a slight surging of liquid back and forth but the amount discharged is greater than that returned and such surging aids in further emulsification. If emulsification is not sufficient, the discharge tube may be turned to the position shown in dot and dash lines in Fig. 1 and the liquid again passed through the emulsifier pump. It will be noted that the motor operates both the stirrer and the pump. While the valve 20 is closed, air will pass back and forth through the emulsifying plug into the pump barrel. Before operation of the machine it should be sterilized. Such sterilization may be performed by filling the bowl 10 with hot water and starting the machine in operation. The valve 20 is opened and the hot water is pumped through the emulsifying pump. It will be noted that there are no pockets for liquid to become entrapped. By releasing the clamp 29 and screw 30, the emulsifying plug may be removed and thoroughly cleaned. Removal of pin 53 permits the plunger to be withdrawn and the barrel thoroughly cleaned.

What I claim is:—

1. A machine for preparing cream from butter and milk comprising a bowl, a heater for said bowl, an oscillating stirrer in said bowl; a single acting emulsifying pump having a smooth bore barrel, a transfer conduit connecting said barrel and bowl whereby the contents of the latter may be fed to said pump, a plunger disposed to overrun the port of said conduit in said barrel, an emulsifying plug detachably inserted in one end of said barrel to close the latter having a groove and a restricted passage connecting said groove and the chamber of said barrel whereby to cause emulsification of the butter and milk, a discharge conduit connected to said groove; and motor means to reciprocate said plunger and oscillate said stirrer.

2. A machine for preparing cream from butter and milk comprising a bowl, a heater for said bowl, an oscillating stirrer in said bowl; a single acting emulsifying pump having a smooth bore barrel, a transfer conduit connecting said barrel and bowl whereby the contents of the latter may be fed to said pump, a plunger disposed to overrun the port of said conduit in said barrel, an emulsifying plug detachably inserted inserted in the end of said barrel to close the latter having a plurality of annular grooves and restricted passages connecting said grooves and the chamber of said barrel whereby to cause emulsification of the butter and milk, a discharge conduit connected to the last of said grooves; a motor means to reciprocate said plunger and oscillate said stirrer.

3. A machine for preparing cream from butter and milk comprising a bowl, an oscillating stirrer in said bowl; a single acting emulsifying pump having a barrel, a transfer conduit connecting said barrel and bowl whereby the contents of the latter may be fed to said pump, a valve in said transfer conduit, a plunger disposed to overrun the port of said conduit in said barrel, an emulsifying plug detachably inserted in the end of said barrel to close the latter having a plurality of annular grooves and restricted passages connecting said grooves and the chamber of said barrel whereby to cause emulsification of the butter and milk, a discharge conduit connected to the last of said grooves; a motor, means connecting said motor and plunger to reciprocate the latter, a reciprocating rack connected to said motor and a pinion connected to said stirrer and in mesh with said rack.

4. A machine for preparing cream from butter and milk comprising a bowl, an oscillating stirrer in said bowl; a single acting emulsifying pump having a barrel, a transfer conduit connecting said barrel and bowl whereby the contents of the latter may be fed to said pump, a valve in said transfer conduit, a plunger disposed to overrun the port of said conduit in said barrel, an emulsifying plug detachably inserted in the end of said barrel to close the latter having a plurality of annular grooves and restricted passages connecting said grooves and the chamber of said barrel whereby to cause emulsification of the butter and milk, a discharge conduit connected to the last of said grooves; a motor, a crank disk operated by said motor, a connecting rod secured to said crank disk and to said plunger, a lateral boss on said connecting rod, a reciprocating rack connected to said boss, and a pinion connected to said stirrer and in mesh with said rack.

5. A machine for preparing cream from butter and milk comprising a bowl, an electric heater for said bowl, an oscillating stirrer in said bowl; a single acting emulsifying pump having a barrel, a transfer conduit connecting said barrel and bowl whereby the contents of the latter may be fed to said pump, a valve in said transfer conduit, a plunger disposed to overrun the port of said conduit in said barrel, an emulsifying plug detachably inserted in the end of said barrel to close the latter having a plurality of annular grooves and restricted passages connecting said grooves and the chamber of said barrel whereby to cause emulsification of the butter and milk, a discharge conduit connected to the last of said grooves; an electric motor connected in circuit with said motor, a crank disk operated by said motor, a connecting rod secured to said crank disk and to said plunger, a lateral boss on said connecting rod, a reciprocating rack connected to said boss, and a pinion connected to said stirrer and in mesh with said rack.

6. A machine for preparing cream from butter and milk comprising a bowl, an oscillating stirrer in said bowl; a single acting emulsifying pump having a barrel, a transfer conduit connecting said barrel and bowl whereby the contents of the latter may be fed to said pump, a rotary plug valve in said transfer conduit, a plunger disposed to overrun the port of said conduit in said barrel, an emulsifying plug detachably inserted in the end of said barrel to close the latter having a plurality of annular grooves and restricted passages connecting said grooves and the chamber of said barrel whereby to cause emulsification of the butter and milk, a discharge conduit connected to the last of said grooves; a motor, a crank disk operated by said motor, a connecting rod secured to said crank disk, a pin detachably securing said rod to said plunger, a lateral boss on said connecting rod, a reciprocating rack detachably connected to said boss by said pin, and a pinion connected to said stirrer and in mesh with said rack.

7. A machine for preparing cream from butter and milk comprising a bowl, an electric heater for said bowl, an oscillating stirrer in said bowl; a single acting emulsifying pump having a barrel, a transfer conduit connecting said barrel and bowl whereby the contents of the latter may be fed to said pump, a rotary plug valve in said transfer conduit, a plunger disposed to overrun the port of said transfer conduit in said barrel, an emulsifying plug detachably inserted in the end of said barrel to close the latter having a plurality of annular grooves and restricted passages connecting said grooves and the chamber of said barrel whereby to cause emulsification of the butter and milk, a discharge conduit connected to the last of said grooves; an electric motor connected in circuit with said heater, a crank disk operated by said motor, a connecting rod secured to said crank disk, a pin detachably securing said rod to said plunger, a lateral boss on said connecting rod, a reciprocating rack detachably connected to said boss by said pin, and a pinion connected to said stirrer and in mesh with said rack.

OSCAR SCHWIMMER.